United States Patent [19]

Rabenstein et al.

[11] 4,269,912

[45] May 26, 1981

[54] LEAD STORAGE BATTERY WITH STORED EXPANDER

[75] Inventors: Heinrich Rabenstein; Angela Kalbitz, both of Frankfurt; Karl H. Kleber, Hofheim, all of Fed. Rep. of Germany

[73] Assignee: Varta Batterie Aktiengesellschaft, Hanover, Fed. Rep. of Germany

[21] Appl. No.: 104,127

[22] Filed: Dec. 17, 1979

[30] Foreign Application Priority Data

Dec. 21, 1978 [DE] Fed. Rep. of Germany ....... 2855313

[51] Int. Cl.³ ............................................. H01M 4/56
[52] U.S. Cl. ..................................... 429/225; 429/215
[58] Field of Search ............................... 429/225–228, 429/215

[56] References Cited

U.S. PATENT DOCUMENTS

| | | | |
|---|---|---|---|
| 3,481,785 | 12/1969 | Ikari | 429/215 X |
| 3,523,041 | 8/1970 | Limbert et al. | 429/225 X |
| 3,556,850 | 1/1971 | Douglas | 429/225 X |
| 4,189,532 | 2/1980 | Golz | 429/215 |

Primary Examiner—Charles F. LeFevour
Attorney, Agent, or Firm—Weiser, Stapler & Spivak

[57] ABSTRACT

For continuous supply of expander material to the negative electrode of a lead storage battery, particularly a quinone derivative, this material is provided within an acid-resistant plastic vessel with an aperture toward the electrolyte, or in a chemically neutral matrix in tablet form.

The size of the aperture or the porosity of the chemically neutral matrix so regulates the expander delivery that uniform supply is insured during at least a portion of the life span of the storage battery.

8 Claims, 1 Drawing Figure

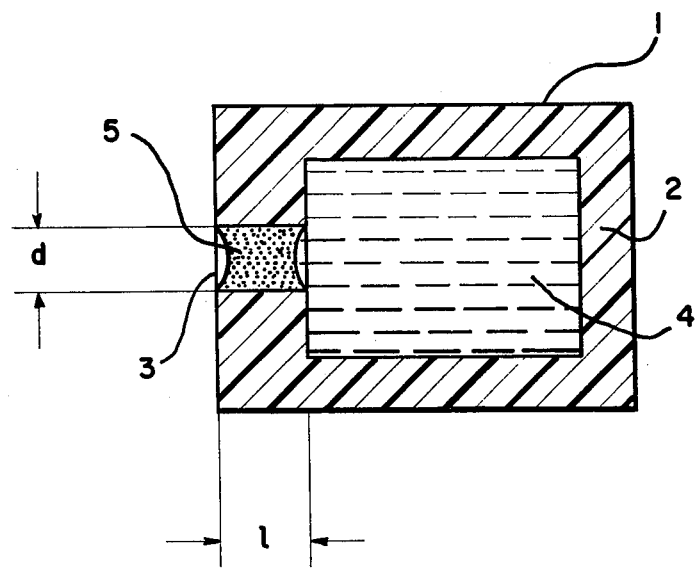

LEAD STORAGE BATTERY WITH STORED EXPANDER

The invention relates to a lead storage battery which contains a reserve of expander material.

The favorable effect of spreader materials (so-called expanders) upon the capacity and life-span of a lead storage battery is well known. As additive to the negative active mass such substances which are of high molecular weight and are soluble in sulfuric acid only to a limited degree interfere with the lead separation and thereby prevent crystallin thickening of the electrode plate. By preserving good porosity, the expander gives rise to high mass utilization and current loading capability. For good starting performance at cold temperature on the part of a lead battery the presence of an expander is also desirable.

On the other hand, the more-than-negligible solubility of the expander material in the storage battery acid leads to a progressive disappearance of the above-mentioned favorable effects, once the electrode plate becomes subject to a reduction in the expander concentration below a predetermined minimum and the material which has already migrated out away becomes inactivated through oxidation at the positive electrode. Moreover, even in the negative electrode itself the expanders may be subject to chemical transformations, e.g. by polymerization, which result in a reduction of their spreading effect.

Under these circumstances, there is provided in the negative electrode at the outset more expander material than would be sufficient for activation of the electrode. On the other hand this excess is no longer available after a predetermined period of operation for the reasons discussed above and this limits the life expectancy of the storage battery.

The lead storage battery is subject to highly variable demands depending upon the mode of operation. As a result the useful life of lead storage batteries is subject to considerable variations despite similar manufacture. Moreover, the end of the useful life which occurs in any particular case frequently coincides with exhaustion of the expander.

It has therefore already been attempted to prolong the effectiveness of the expander by introducing it only in accordance with the actual need and with a time delay. This has been done in accordance with German Patent Publication (Auslegeschrift) No. 2,736,750 by enclosing the material in a plurality of tiny capsules which are uniformly distributed within the negative active mass. These capsules constitute collectively a sort of reservoir from which the expander is progressively liberated in the course of gradual dissolution of the encapsulating material.

An object of the present invention is to provide a storage battery in which there is a reserve quantity of expander but in much simplified manner, and in which controlled delivery of the expander to the negative electrode is achieved.

These and other objects which will appear are accomplished in accordance with the invention by placing during at least a portion of the life of the storage battery a reservoir of expander material in the electrolyte from which this expander is capable of being delivered.

It has been found that, from such an expander reservoir, the expander material is gradually dissolved out by the electrolyte and is adsorptively taken up by the negative electrode.

In a preferred embodiment of the invention, the expander reservoir is present enclosed within a cavity which has at least one opening toward the electrolyte.

For further details reference is made to the discussion which follows in light of the accompanying drawing wherein the single FIGURE is a schematic illustration of such an arrangement.

Referring to this drawing, there is shown a vessel 1 with a wall 2, which is preferably made of an acid resistant synthetic plastic selected from the group of polyethylene, polypropylene, polystyrene, polyvinylchloride, polytetrafluorethylene, and polyester. In the wall there is an aperture 3 of predetermined length l and predetermined diameter d. The cavity 4 of vessel 1 is filled with the expander material.

The quantity of spreader material which will diffuse outward per unit time depends upon the dimensions of the aperture, i.e. of the diffusion path l and the diameter d, or rather of its free aperture cross-section, since this aperture need not necessarily be circular. In order to calculate the intensity of outflow, the solubility and diffusion coefficient of the expander material must also be known.

In order to preclude unexpected convection processes, in a further preferred embodiment of the invention the exit aperture is filled with a porous material 5. This insures that the emission occurs only within the predictable limits of a pure diffusion process.

Instead of the simplified illustration of FIG. 1, the housing wall 2 may also be porous or perforated. However, this housing wall can also be completely omitted if the expander store is, for example, compressed into a tablet and the latter is freely accessible to the electrolyte.

Both the tablet, as well as the cavity 4 of vessel 1 filled with the expander, may be traversed in accordance with the invention by a porous matrix in which the spreader material is additionally fixated and which simultaneously moderates its outward migration.

For storage battery cells with electrolyte circulation it is not necessary to permanently position the expander reservoir below the electrolyte surface level which is in motion. In that instance, it suffices to place the expander reservoir at a suitable location in the circulation path of the pump, where the electrolyte flows past it and causes its consumption only during the charging phase. In this manner, extending and economy of expander becomes possible.

The reservoir of expander according to the invention also makes it possible to carry out a supplemental spreading of the negative electrode, after exhaustion of the original expander additive which had, for example, been mixed in with the negative preparation in conventional manner, in order to reactivate the storage battery for a further operating period. Continuous resupply of expander material is thereby insured for at least an additional portion of the lifetime of the storage battery. In addition, by use of a reservoir, the quantity of expander used in the mass preparation can be low. This is desirable because a large quantity of spreader material promotes intensified evolution of $H_2$ because it retards the Pb elimination. Through addition of an expander tablet to the electrolyte, which may be carried out conveniently during a servicing operation, the supplemental spreading becomes particularly easy to perform.

To determine the point in time at which supplemental spreading is required, those analysis procedures used to determine the expander concentration present at any given time have proven to be unsuccessful because of unreliable results.

A better indication of the degree of activity of the negative electrode is provided by measuring and comparing the individual capacities of electrodes of both polarities. The negative electrode initially has a higher capacity than the positive electrode, which therefore determines the useful capacity of the storage battery. Should there then arise the danger that the negative electrode capacity may fall below that of the positive one, this may be taken as an indication of a critical shortage of the spreader material effectiveness, which must be followed by prompt supplemental spreading.

In practice it suffices to follow the rule that supplemental spreading is required generally after 400 cycles and at the earliest after 200 cycles, based on the assumption that the storage battery plates are initially spread in conventional manner.

If the storage battery is used under unfavorable conditions, i.e. at high temperature, with rapid cycling, and little overcharge, the useful capacity can decline prematurely. In that case, the supplemental spreading is preferably carried out as soon as there has been a drop below about 85% or perhaps even 95% of the rated capacity.

Continuous and controlled expander effect presupposes that the spreader material is a chemically defined substance and that its behavior can be predicted with reasonable accuracy under the operating conditions of the storage battery, due to its predetermined properties such as molecular size, solubility, etc.

For the reservoir according to the invention, organic compounds from the group of quinones, hydrated quinones, or substituted quinones are suitable. As derivatives of the quinones there are known p-benzoquinone, quinhydrone, naphthoquinone, and phenanthrenequinone. Among the hydrated quinones, effective spreading materials are cyclohexanol, cyclohexanon, 1,4 cyclohexanodiol, 1,4 cyclohexanodion, 1,2,3,4-tetrahydronaphtalene, or anthrone (9-oxo-10, 10-dihydroanthracene). For substituted quinones there are those with methoxy-, methyl-, hydroxy-, or carbolic acid groups. Also included are the anthraquinone dyes, alizarin sulfonate (1,2 dioxianthraquinone sulfonate, sodium salt) having an especially good spreading effect.

If the negative lead electrode is to be supplied from the expander reservoir in accordance with the invention continuously with a sufficient quantity of spreader material per unit time, then this spreader material flow is determined by a diffusion current I (e.g. in mol/sec). In order to appropriately dimension the opening cross-section F of the aperture in storage vessel 1 (see drawing) for the diffusion current I, the diffusion path l, the saturation concentration C and the diffusion coefficient D of the spreader material must be taken into account as determining factors. For molecules which are substantially larger than the solvent molecules, the diffusion coefficient can be calculated by the known formula $$D = R \times T/6 \, N\pi\eta r.$$

For the aperture cross-section there then applies the formula $$F = \frac{I \times l}{D \times C}$$

Using values corresponding to the above-mentioned alizarin sulfonate, in which $I = 10^{-11}$ mol/sec, $l = 1$ cm, $D = 5 \times 10^{-6}$ cm$^2$/sec and $C = 10^{-5}$ mol/cm$^3$, there is obtained for example $F = 0.2$ cm$^2$.

For a predetermined F the diffusion path l, that is the aperture length, must be matched to the diffusion current I.

As a precaution against unexpected exhaustion of the expander in such a reservoir vessel it is possible to make its content detectable from the outside by selecting in accordance with the invention a transparent housing material, for example Plexiglas which forms part of the group of polyesters. The anthraquinone dyes which are well suited for use as spreader materials also particularly facilitate optical surveillance.

What is claimed is:

1. Lead storage battery containing a reservoir means of expander material wherein
   during at least a portion of the useful life of the storage battery a reservoir means of expander material is provided in the electrolyte for delivering the expander progressively into the electrolyte.

2. Lead storage battery containing a reservoir of expander material wherein
   during at least a portion of the useful life of the storage battery a reservoir of expander material is provided in the electrolyte from which the expander is deliverable, and
   a vessel in communication with the electrolyte through at least one aperture,
   the expander reservoir filling a cavity of the vessel partially or completely.

3. The battery of claim 2 wherein
   the aperture connected with the electrolyte is filled with a porous body.

4. The battery of claim 2 wherein
   the cavity of the vessel is enclosed by a wall which is perforated or porous.

5. The battery of claim 2 wherein
   the vessel has a wall which is predominantly made of an acid-resistant synthetic plastic selected from the group of polyethylene, polypropylene, polystyrene, polyvinylchloride, polytetrafluorethylene and polyester.

6. The battery of claim 2 wherein
   the vessel has a wall which is at least partly of a transparent material.

7. The battery of claim 2 wherein
   the expander reservoir is traversed by a porous matrix.

8. Lead storage battery containing a reservoir of expander material wherein
   during at least a portion of the useful life of the storage battery a reservoir of expander material is provided in the electrolyte from which the expander is deliverable,
   the expander reservoir being present in the electrolyte in the form of a tablet.

* * * * *